US008414712B2

(12) United States Patent
Yoshizawa et al.

(10) Patent No.: US 8,414,712 B2
(45) Date of Patent: Apr. 9, 2013

(54) THIN STRIP OF AMORPHOUS ALLOY, NANOCRYSTAL SOFT MAGNETIC ALLOY, AND MAGNETIC CORE

(75) Inventors: Yoshihito Yoshizawa, Kumagaya (JP); Motoki Ohta, Kumagaya (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 12/675,286

(22) PCT Filed: Mar. 30, 2009

(86) PCT No.: PCT/JP2009/056476
§ 371 (c)(1),
(2), (4) Date: Feb. 25, 2010

(87) PCT Pub. No.: WO2009/123100
PCT Pub. Date: Oct. 8, 2009

(65) Prior Publication Data
US 2010/0230010 A1    Sep. 16, 2010

(30) Foreign Application Priority Data
Mar. 31, 2008  (JP) .................................. 2008-092784

(51) Int. Cl.
*C22C 45/02*    (2006.01)
(52) U.S. Cl.
USPC .............................. 148/304; 420/89; 420/117
(58) Field of Classification Search ................... 148/304
See application file for complete search history.

(56) References Cited

U.S. PATENT DOCUMENTS
6,425,960 B1 * 7/2002 Yoshizawa et al. ........... 148/300

FOREIGN PATENT DOCUMENTS
| JP | 4-4393 | B2 | 3/1989 |
| JP | 01-242755 | A | 9/1989 |
| JP | 2001-001113 | A | 1/2001 |
| JP | 2002-075718 | A | 3/2002 |
| JP | 2006-316348 | A | 11/2006 |
| JP | 2007-182594 | A | 7/2007 |

OTHER PUBLICATIONS

Mattern et al., "Effect of Cu and Nb on crystallization and magnetic properties of amorphous Fe(77.5)Si(15.5)B(7) alloys", 1995 (no month), Materials Science and Engineering, A 194, pp. 77-85.*
Machine translation of JP 2002-075718, published Mar. 15, 2002.*

* cited by examiner

*Primary Examiner* — George Wyszomierski
(74) *Attorney, Agent, or Firm* — Sughrue Mion, PLLC (57) ABSTRACT

Disclosed are a thin strip of an amorphous alloy having excellent workability, a nanocrystalline soft magnetic alloy which can stably provide good magnetic properties, and a magnetic core using the nanocrystalline soft magnetic alloy. The thin strip of an amorphous alloy is characterized in that the thin strip is formed of an alloy having a composition represented by $Fe_{100-a-b-c-d}M_aSi_bB_cCu_d$ (atomic %), wherein $0 \leq a \leq 10$, $0 \leq b \leq 20$, $4 \leq c \leq 20$, $0.1 \leq d \leq 3$, and $9 \leq a+b+c \leq 35$, and containing unavoidable impurities, and, in the composition, M represents at least one element selected from Ti, V, Zr, Nb, Mo, Hf, Ta, and W, a Cu segregated part is present, on the surface side of the thin strip of the amorphous alloy, in which Cu is segregated at a higher concentration than the Cu concentration in the outermost surface part of the thin strip of the amorphous alloy, and the highest Cu concentration in the Cu segregated part is not more than 4 atomic %.

3 Claims, 5 Drawing Sheets

THIN STRIP OF AMORPHOUS ALLOY, NANOCRYSTAL SOFT MAGNETIC ALLOY, AND MAGNETIC CORE

CROSS REFERENCE TO RELATED APPLICATIONS

This application is a National Stage of International Application No. PCT/JP2009/056476 filed Mar. 30, 2009, claiming priority based on Japanese Patent Application No. 2008-092784 filed Mar. 31, 2008 the contents of all of which are incorporated herein by reference in their entirety.

TECHNICAL FIELD

The present invention relates to a thin strip of amorphous alloy (i.e. an amorphous alloy ribbon) excellent in workability for a nanocrystalline soft magnetic alloy, a nanocrystalline soft magnetic alloy exhibiting excellent magnetic properties, and a magnetic core using the nanocrystalline soft magnetic alloy, used for various types of transformers, various types of reactors and choke coils, noise suppression parts, pulse power magnetic components used for laser power sources, accelerators and the like, pulse transformers for communication, various types of motor magnetic cores, various types of power generators, various types of magnetic sensors, antenna magnetic cores, various types of current sensors, magnetic shields, and the like.

BACKGROUND ART

As soft magnetic materials used for various types of transformers, various types of reactors, choke coils, noise control components, laser power sources, pulse power magnetic components for accelerators, and the like, there are known silicon steels, ferrites, amorphous alloys, nanocrystalline alloys and the like.

However, since ferrite materials have problems of having a low saturation magnetic flux density and poor temperature characteristics, they are unsuitable for applications of high powers such as coil components for high-capacity inverters and power sources, and distribution transformers because they easily saturate magnetically. Although silicon steel plates are inexpensive in terms of their materials and have a high magnetic flux density, but they have a problem of exhibiting a high magnetic core loss for high-frequency applications.

On the other hand, amorphous alloys are generally manufactured by quenching raw materials from a liquid phase or a gas phase. Therefore, it is known that since Fe-based and Co-based amorphous alloys have no crystal grains, they intrinsically exhibit no crystal magnetic anisotropy and exhibit excellent soft magnetic properties. Hence, Fe-based and Co-based amorphous alloys are used for power transformer iron cores, choke coils, magnetic heads, current sensors and the like.

It is known that nanocrystalline alloys exhibit excellent soft magnetic properties comparable to Co-based amorphous alloys and a high saturation magnetic flux density comparable to Fe-based amorphous alloys, and are used for magnetic cores for common-mode choke coils, high-frequency transformers, pulse transformers and the like.

As the representative compositions, there are known Fe—Cu—(Nb, Ti, Zr, Hf, Mo, W, Ta)—Si—B alloys, Fe—Cu—(Nb, Ti, Zr, Hf, Mo, W, Ta)—B alloys cited in Patent Document 1 and Patent Document 2, and the like. These Fe-based nanocrystalline alloys are fabricated by annealing amorphous alloys prepared by rapid quenching technique from a melt or gas phase to microcrystallize them. As methods for quenching from a liquid melt phase, there are known a single roll method, a twin roll method, a centrifugal quenching method, an in-rotating liquid spinning method, an atomizing method, a cavitation method, and the like. As methods for quenching from a gas phase, there are known a sputter method, a vapor deposition method, an ion plating method, and the like. Fe-based nanocrystalline alloys are ones obtained by microcrystallizing amorphous alloys fabricated by these methods, and have almost no thermal instability, which is seen in amorphous alloys, and are known to exhibit excellent soft magnetic properties having a high saturation magnetic flux density in the same levels as in Fe-based amorphous alloys and low magnetostriction. Further, nanocrystalline alloys are known to exhibit little change over time and to be excellent in temperature characteristics.

Patent Document 3 studies such an Fe-based nanocrystalline alloy as described above, and discloses, for example, a soft magnetic ribbon in which the Fe atom concentration is higher at a position deeper than 10 nm from the surface in terms of $SiO_2$ than the oxygen atom concentration, and the Cu atom concentration is locally raised at a position deeper than 5 nm from the surface.

Patent Document 4 also describes that, as a technique to work an amorphous alloy ribbon, the workability is raised by addition of C, P, S elements and the like to an alloy composition.

Patent Document 1: JP 04-4393 B
Patent Document 2: JP 01-242755 A
Patent Document 3: JP 2002-75718 A
Patent Document 4: JP 2006-316348 A

DISCLOSURE OF THE INVENTION

Problems to be Solved by the Invention

An amorphous alloy ribbon is generally manufactured by a rapid quenching method such as a single roll method. A nanocrystalline soft magnetic alloy is manufactured by annealing and crystallizing the amorphous alloy ribbon. In mass production, the improvement in mass productivity and the reduction of the material cost are necessary. Therefore, the manufacturing process is carried out by manufacturing a broad amorphous alloy ribbon over a long time to manufacture a continuous amorphous alloy ribbon, subjecting the continuous alloy ribbon to work such as cutting, punching or slitting, and annealing the amorphous alloy ribbon to manufacture a nanocrystalline soft magnetic alloy in this order. However, since a nanocrystalline soft magnetic alloy manufactured by annealing an amorphous alloy ribbon has been embrittled, work is difficult. Hence, an amorphous alloy ribbon for a nanocrystalline soft magnetic alloy needs to be good in workability.

As described above, an amorphous alloy ribbon manufactured in a mass production level has a problem of being liable to be embrittled. As one of the reasons, it is considered that the element concentration distribution of the ribbon surface varies by depending on the roll temperature rise, the casting atmosphere and the like.

If an amorphous alloy ribbon is embrittled, work such as cutting, punching or slitting becomes difficult, thereby causing a problem in manufacturing a magnetic core.

As in Patent Document 4, the addition of N, C, P elements and the like reduces magnetic properties, whereby the application to manufacture of a nanocrystalline soft magnetic alloy requiring high magnetic properties is difficult.

Therefore, the appearance of an amorphous alloy ribbon for a nanocrystalline soft magnetic alloy having a good workability is strongly desired.

Soft magnetic properties of a nanocrystalline soft magnetic alloy manufactured by annealing and nanocrystallizing the above-mentioned amorphous alloy ribbon are liable to be influenced by a thermal history of the ribbon during manufacture thereof.

Especially a broad amorphous alloy ribbon for nanocrystalline materials is liable to cause change in quality of the ribbon surface due to a roll temperature rise at the point of mass production, and the element concentration distribution of the surface is influenced by the manufacturing condition at the point of mass production. This is also influenced by the element concentration distribution of an alloy surface after the alloy is nanocrystallized by anneal. Since this element distribution has an influence on magnetic properties, it is important to control the element distribution of an alloy surface after nanocrystallization anneal in order to obtain excellent soft magnetic properties.

Then, it is an object of the present invention to provide an amorphous alloy ribbon excellent in workability for a nanocrystalline soft magnetic alloy, a nanocrystalline soft magnetic alloy exhibiting excellent magnetic properties, and a magnetic core using the nanocrystalline soft magnetic alloy, used for various types of transformers, various types of reactors and choke coils, noise control components, pulse power magnetic components used for laser power sources, accelerators and the like, pulse transformers for communication, various types of motor magnetic cores, various types of power generators, various types of magnetic sensors, antenna magnetic cores, various types of current sensors, magnetic shields, and the like.

Means for Solving the Problems

The present invention has realized an amorphous alloy ribbon which is suitable as a nanocrystalline soft magnetic alloy and excellent in workability, by controlling the concentration distribution of the Cu element by controlling the manufacturing condition when the amorphous alloy ribbon for a nanocrystalline soft magnetic alloy containing Cu is manufactured.

The amorphous alloy ribbon according to the present invention is an amorphous alloy ribbon having a composition made of alloy composition represented by $Fe_{100-a-b-c-d}M_aSi_bB_cCu_d$ (wherein 0 at. %$\leq$a$\leq$10 at. %, 0 at. %$\leq$b$\leq$20 at. %, 4 at. %$\leq$c$\leq$20 at. %, 0.1 at. %$\leq$d$\leq$3 at. %, and 9 at. %$\leq$a+b+c$\leq$35 at. %) and inevitable impurities, wherein M comprises at least one element selected from Ti, V, Zr, Nb, Mo, Hf, Ta and W. And this ribbon is characterized in that a Cu-segregated portion is present where Cu is segregated in a higher concentration in the surface side of the amorphous alloy ribbon than in the outermost surface thereof and that the maximum value of the Cu concentration in the Cu-segregated portion is 4 at. % or less. The characteristic of the Cu-segregated portion is observed on both surfaces of the ribbon. The Cu-segregated portion refers to a portion where the concentration of Cu is locally high, and is mainly observed in the depth range of 2 nm to 20 nm from the surface. The maximum value of the Cu concentration in the Cu-segregated portion is higher than in a parent phase at the central part of the ribbon in most cases.

In the present invention, if the maximum value of the Cu concentration in the Cu-segregated portion exceeds 4 at. %, since the workability of the ribbon is remarkably deteriorated, work such as punching, slitting or cutting becomes difficult. Therefore, an amorphous alloy ribbon needs to be manufactured by controlling the Cu concentration so that the maximum value thereof becomes 4 at. % or less. In order to control the Cu concentration distribution, the cooling rate (temperature of the ribbon) needs to be controlled in manufacturing the amorphous alloy ribbon (details are described later). Making the maximum value of the Cu concentration in the Cu-segregated portion to be 4 at. % or less allows for manufacturing an amorphous alloy ribbon excellent in toughness, which can provide preferable results.

In an amorphous alloy ribbon where the maximum value of the Cu concentration in the Cu-segregated portion is higher than the Cu concentration at a position of 500 nm from the ribbon surface as well as a Si-segregated portion is present at a position nearer the surface side than the Cu-segregated portion, Si oxide excellent in insulation property is present in the surface. And hence, in the case of using the ribbon for a magnetic core, the interlayer insulating resistance is enhanced and excellent high-frequency magnetic properties can be achieved. The Cu concentration becomes nearly the same as the Cu amount of the alloy composition at a position of 500 nm from the surface of the ribbon. That is, a nanocrystalline layer of a parent phase is present at a position of 500 nm from the surface of the ribbon. Making a region where an Fe concentration takes a minimum value to be present at a shallow position nearer the surface side than the position where the Si-segregated portion is present further improves the insulation property.

A specific method for manufacturing an amorphous alloy ribbon involves firstly manufacturing an alloy having an amorphous phase as a main phase from a molten metal having the above-mentioned composition by a rapid quenching technique such as a single roll method, and thereafter working and annealing the alloy to form an ultrafine crystal grain structure having an average grain diameter of 50 nm or less. In the manufacture and anneal of a ribbon by a rapid quenching technique such as a single roll method, the oxygen concentration in an atmosphere of Ar, He, nitrogen, carbon monoxide, or carbon dioxide, in the air, or under reduced pressure is controlled. In order to manufacture the amorphous alloy ribbon according to the present invention, when an amorphous alloy ribbon containing Cu is manufactured by a liquid quenching method such as a single roll method, it is important that the temperature the ribbon on the roll during manufacture is controlled. In the case of manufacturing a broad amorphous alloy ribbon, an amorphous alloy ribbon is cooled in close contact with a cooling roll even after the ribbon has been solidified on the cooling roll. It has been found that the thermal history of an amorphous alloy ribbon on the roll has a large influence on the Cu concentration distribution of the alloy ribbon surface, and has an influence on the microstructure of the surface and magnetic properties after the anneal.

The amorphous alloy ribbon containing Cu according to the present invention is manufactured under the temperature condition where the temperature of the alloy ribbon at a position of 250 mm in the roll circumferential direction from a tapping position is 200° C. or higher and 400° C. or less. If the temperature of the alloy ribbon at the position of 250 mm is lower than 200° C., a Cu-segregated portion and a region where the Cu concentration is low are not fully formed, and therefore a coarse crystal is liable to be formed in the surface after the anneal. If the temperature exceeds 400° C., the amorphous alloy ribbon is liable to be embrittled at a stage before the anneal, which is not preferable.

Further, in manufacturing the amorphous alloy ribbon according to the present invention, manufacturing the ribbon in an atmosphere where oxygen of 5% or more is contained in a gas in the vicinity of the ribbon closely contacting with the roll can control the Si concentration peak at a shallow position nearer the surface side than the Cu-segregated portion, and can control the thickness of a $SiO_2$-based oxide film in the ribbon surface, thereby improving the insulation property, and improving high-frequency magnetic properties in the case of making a laminated magnetic core and a wound magnetic core thereof. In the nanocrystalline soft magnetic alloy according to the present invention, if the oxygen concentration (at. %) at a position of 12 nm from the alloy surface is higher than the Fe concentration (at. %) thereat, the insulation of the surface is difficult to be broken. Also, if this is used for a wound magnetic core and a laminated magnetic core, the deterioration and the variation of high-frequency magnetic properties can be suppressed.

Further, in the present invention, by controlling the segregation of elements in the vicinity of the surface of a nanocrystalline soft magnetic alloy after crystallization when an amorphous alloy ribbon composed of a predetermined alloy composition is nanocrystallized by anneal, a nanocrystalline soft magnetic alloy exhibiting excellent soft magnetic properties and having small variations in characteristics, and a magnetic core using the nanocrystalline soft magnetic alloy can be achieved.

The nanocrystalline soft magnetic alloy according to the present invention is a nanocrystalline soft magnetic alloy containing a Cu element in which crystal grains of 50 nm or smaller in average grain diameter are present at least partially, and which is characterized in that a Cu-segregated portion where the Cu element is segregated at a position deeper than 2 nm from the surface of the alloy is present, and the maximum value of the Cu concentration in the Cu-segregated portion is 6 at. % or less.

In this case, the oxygen concentration at a position of 12 nm from the alloy surface is preferably higher than the Fe concentration thereat.

In annealing an amorphous alloy ribbon containing Cu to nanocrystallize it, controlling the Cu concentration in the surface can suppress the coarsening of crystal grains formed in the alloy ribbon surface in the anneal and can micronize them, which can prevent soft magnetic properties from being deteriorated. Hence, the deterioration of soft magnetic properties due to the formation of coarse crystal grains can be suppressed. If an amorphous alloy ribbon before the anneal contains no Cu-segregated portion, coarse crystal grains are easily formed and the range of a reasonable anneal condition is narrowed, and soft magnetic properties are liable to be deteriorated. As Cu concentration is too high, iron loss increases and soft magnetic properties are deteriorated.

In addition to the control of the segregation of the Cu element, the oxygen concentration at a position of 12 nm from the alloy surface is preferably controlled so as to be higher than the Fe concentration thereat. And, a synergistic effect caused by the facts that the segregation of the Cu element is present and the element distribution in which the oxygen concentration at a position of 12 nm from the alloy surface is higher than the Fe concentration thereat is the improvement of iron loss.

Preferably, a region where the Cu concentration is lower than that in the parent phase is present at a position deeper than the above-mentioned Cu-segregated portion, and the minimum value of the Cu concentration at this position is lower than 40% of the Cu concentration in the parent phase. Here, a concentration in the parent phase refers to an average concentration of each element measured at a deep position of 500 nm or more from a ribbon surface.

The maximum value of the Cu concentration in the Cu-segregated portion is preferably two or more times the Cu concentration in the parent phase.

Particularly, if the anneal is carried out so that the maximum value of the Cu concentration in the Cu-segregated portion is two or more times the Cu concentration in the parent phase as well as so that the minimum value of the Cu concentration present at a position deeper than the Cu-segregated portion is lower than 40% of the Cu concentration in the parent phase, the formation of coarse crystal grains in the anneal can be suppressed and soft magnetic properties become hardly deteriorated, thereby providing a more preferable result.

Alloy compositions of the amorphous alloy ribbon and nanocrystalline soft magnetic alloy according to the present invention will be described below. The amorphous alloy ribbon according to the present invention is an amorphous alloy ribbon consisting of alloy composition represented by $Fe_{100-a-b-c-d}M_aSi_bB_cCu_d$ (wherein 0 at. %$\leq$a$\leq$10 at. %, 0 at. %$\leq$b$\leq$20 at. %, 4 at. %$\leq$c$\leq$20 at. %, 0.1 at. %$\leq$d$\leq$3 at. %, and 9 at. %$\leq$a+b+c$\leq$35 at. %) and inevitable impurities, and Fe is an essential element in the alloy composition.

M in the alloy composition comprises at least one element selected from Ti, V, Zr, Nb, Mo, Hf, Ta and W, and has an effect of aiding amorphization and an effect of decreasing crystal grain size when crystallization is carried out by anneal. Further, an element such as Ti, Nb or Ta also has an effect of improving corrosion resistance.

The value of "a" showing the M amount in the alloy composition needs to be 10 at. % or less. This is because, when the M amount exceeds 10 at. %, the magnetic flux density remarkably decreases. However, even if the value of "a" showing the M amount is 0 at. %, an amorphous alloy ribbon can be manufactured, and if the maximum value of the Cu concentration in the Cu-segregated portion is decreased, the workability is improved similarly to the case of an amorphous alloy ribbon containing the M element. Si has an effect of aiding amorphization, and Si in a nanocrystalline soft magnetic material has effects of improving soft magnetic properties and reducing magnetostriction. Further, Si segregated in a form of an oxide in the surface has effects of improving environmental resistance, and improving interlayer insulation property in the case of using the material for a magnetic core.

The value of "b" showing Si amount needs to be 20 at. % or less. This is because, when the Si amount exceeds 20 at. %, the saturation magnetic flux density remarkably decreases. This is not preferable. The especially preferable range of the value of "b" showing the Si amount is 8 at. %$\leq$b$\leq$17 at. %, which can provide excellent soft magnetic properties. However, even if the value of "b" showing the Si amount is 0 at. %, an amorphous alloy ribbon can be manufactured, and if the maximum value of the Cu concentration in the Cu-segregated portion is decreased, the workability is improved similarly to the case of an amorphous alloy ribbon containing the M element.

B is an element enhancing an amorphousness forming capability, and the value of "c" showing B amount needs to be 4 at. % or more and 20 at. % or less. This is because, when the B amount is less than 4 at. %, the amorphousness formation becomes difficult, which is not preferable; and when the B amount exceeds 20 at. %, the saturation magnetic flux density remarkably decreases. The especially preferable range of the value of "c" showing the B amount is 5 at. %$\leq$c$\leq$10 at. %, and can provide especially excellent soft magnetic properties after the nanocrystallization, and can relatively lower the magnetostriction.

Cu has an effect of micronizing crystal grains and uniformizing the crystal grain structure in the nanocrystallization. If Cu is less than 0.1 at. %, this effect is insufficient. On the other hand, the value of "d" showing the Cu amount needs to be 3 at. % or less. This is because, when the value of "d" showing the Cu amount exceeds 3 at. %, manufacture of a continuous amorphous alloy ribbon becomes difficult. The especially preferable range of the value of "d" showing the Cu amount is 0.4 at. %≦d≦2 at. %, and more preferably 0.5 at. %≦d≦1.5 at. %; and in this range, manufacture of an amorphous alloy ribbon is easy and especially excellent soft magnetic properties can be achieved in a nanocrystalline alloy after the nanocrystallization.

The sum total "a+b+c" of the value "a" showing the M amount, the value "b" showing Si amount and the value "c" showing the B amount needs to be 9 at. %≦a+b+c≦35 at. %. This is because, when the sum total "a+b+c" of the value "a" showing M amount, the value "b" showing Si amount and the value "c" showing B amount is less than 9 at. %, amorphization is difficult; and when the sum total exceeds 35 at. %, the saturation magnetic flux density remarkably decreases.

Inevitable impurities in the amorphous alloy according to the present invention include N, O and S; and the cases containing trace amounts of these elements are within the present invention.

In the amorphous alloy ribbon according to the present invention, 50% or less of the Fe amount can be substituted with at least one element selected from Co and Ni. By substituting Co and Ni for Fe, the induced magnetic anisotropy of the nanocrystalline soft magnetic alloy can be controlled. The case of Co can also have an effect of improving the saturation magnetic flux density.

In the amorphous alloy ribbon and the nanocrystalline soft magnetic alloy according to the present invention, 50% or less of the total amount of Si and B can be substituted with at least one element selected from C, Al, P, Ga and Ge. The substitution of these elements can regulate the magnetostriction and magnetic properties of the nanocrystalline soft magnetic alloy nanocrystallized by the anneal. P is an amorphousness forming element, and has also a function of aiding the amorphization.

50% or less of M can be substituted with at least one element selected from Cr, Mn, Zn, As, Se, Sb, Sn, In, Cd, Ag, Bi, Mg, Sc, Re, Au, platinum group elements, Y, and rare earth elements.

In order to obtain a uniform microstructure in the nanocrystalline soft magnetic alloy according to the present invention, it is important that at the time when an alloy ribbon is manufactured by a liquid quenching method after raw materials are melted, a structure having an amorphous phase as a main phase is obtained. In the present invention, crystal grains are allowed to be present in an amorphous alloy ribbon manufactured by the liquid quenching method, but the amorphous alloy ribbon is desirably composed of an amorphous single phase if at all possible.

Thereafter, the amorphous alloy ribbon is subjected to an anneal to the temperature range equal to or higher than the crystallization temperature to make a structure in which crystal grains having a body-centered cubic structure of 50 nm or less in crystal grain diameter are dispersed in an amorphous parent phase. By making the nanocrystalline grain phase account for 50% or more in volume fraction, the soft magnetism can further be improved and the magnetostriction reduction can be achieved.

The volume ratio of crystal grains is determined by the line segment method. That is, the volume ratio of crystal grains is obtained by assuming an optional straight line in a microstructure photograph and measuring the length $L_t$ of the test line and the length $L_c$ of the line occupied by crystal phases, and determining a proportion, $L_L=L_c/L_t$, of the length of the line occupied by crystal grains. The crystal grain diameter of crystal grains present in the alloy after the anneal is desirably 50 nm or lower. This is because, if the crystal grain diameter exceeds 50 nm, soft magnetic properties are remarkably deteriorated, which is not preferable. The especially preferable crystal grain diameter is 5 nm to 20 nm, thereby providing especially excellent soft magnetism.

The nanocrystalline soft magnetic alloy according to the present invention can be obtained by firstly manufacturing an alloy having an amorphous phase as a main phase from a molten metal having the above-mentioned composition by a rapid quenching technique such as a single roll method, and thereafter mechanically working, as required, and annealing the alloy to form an ultramicrocrystal structure having an average grain diameter of 50 nm or less. In the manufacture of a ribbon by a quenching technique such as a single roll method and anneal thereof, the oxygen concentration in an atmosphere of Ar, He, nitrogen, carbon monoxide, or carbon dioxide, in the air, or under reduced pressure is controlled.

The amorphous alloy ribbon according to the present invention is converted to the above-mentioned nanocrystalline soft magnetic alloy by annealing the amorphous alloy ribbon at a temperature equal to or higher than the crystallization temperature. By making the anneal to be annealed in a magnetic field, soft magnetic properties of the nanocrystalline soft magnetic alloy are improved due to the induced magnetic anisotropy. The anneal in a magnetic field to impart an induced magnetic anisotropy is carried out while the magnetic field is being applied during a part of the anneal duration or the whole duration. The applied magnetic field may be any one of direct current, alternating current and repeating pulse magnetic fields. Making the intensity of the applied magnetic field to be nearly equal to or higher than an intensity at which the alloy is magnetically saturated provides a preferable result. The anneal in a magnetic field can provide a material exhibiting a B—H loop good in squareness or a B—H loop good in linearity. Soft magnetic properties can be also improved by an anneal in a rotary magnetic field. The anneal can be carried out in the air, vacuum, Ar or an inert gas such as nitrogen, but especially desirably in an inert gas. The anneal is ordinarily carried out in the range of 350° C. to 650° C. The time for which the temperature is held at a constant temperature is ordinarily 24 hours or less, and preferably 4 hours or less, from the viewpoint of mass productivity. Especially desirable is 1 hour or less. The average temperature raising rate of the anneal is preferably 0.1° C./min to 10,000° C./min, and more preferably 100° C./min or higher, which can provide a low coercive force. The anneal may be carried out not as a one-stage treatment, but as a multistage treatment or a more-than-once treatment. Further, the anneal may be carried out using a Joule heat by making a current flow directly in the alloy, or using a generated heat by a high-frequency magnetic excitation. By imparting an induced magnetic anisotropy by an anneal under a stress, the B—H loop shape can also be controlled.

The nanocrystalline soft magnetic alloy according to the present invention is treated to form an insulating layer thereon by a chemical conversion to coat the alloy ribbon surface with a powder or film such as $SiO_2$, MgO or $Al_2O_3$ according to need, or is subjected to a treatment of forming an oxide insulating layer on the surface by an anodic oxidation treatment to carry out an interlayer insulation, or another treatment, which can further enhance the insulation property. This has the effects of further reducing eddy current crossing an interlayer especially in the case of being excited with a high-frequency, and further improving the magnetic core loss at a high-frequency. An application of an interlayer insulation to a magnetic core which has a good surface condition and is formed of a broad ribbon can provide the effect of further remarkably improving high-frequency magnetic properties. Further, impregnation, coating and the like may be carried out according to need when a magnetic core is manufactured from the alloy according to the present invention. The alloy according to the present invention exhibits performances most effectively in application products for a high-frequency applications, especially in which a pulsatory current is made to flow. But, this can be used for applications to sensors and low-frequency magnetic components. Particularly, the alloy can exhibit excellent properties in applications in which the magnetic saturation is a problem, and is especially suitable in applications to power electronics requiring high-power.

Further, since the nanocrystalline soft magnetic alloy according to the present invention can provide excellent properties even if the alloy is made to be powdery, the alloy can be also utilized for a pressed powder core, a noise absorbing sheet and the like.

The microcrystal grains formed in the above-mentioned nanocrystalline soft magnetic alloy have a crystal phase of a body-centered cubic structure (bcc) composed mainly of Fe, and may contain Co, Ni, Si, B, Ge, Zr and the like as a solid solution, and may contain an ordered lattice. The remaining part other than the crystal phase is mainly an amorphous phase, but an alloy composed substantially of a crystal phase only is involved in the present invention. A phase (fcc phase) of a face-centered cubic structure containing Cu may be present.

An alloy having a structure in which bcc crystal grains in nano scale are dispersed in an amorphous parent phase has a high resistivity, and suppresses crystal grain growth and improves high-frequency magnetic properties, which can provide a more preferable result.

The nanocrystalline soft magnetic alloy according to the present invention may contain partially a compound phase. However, in the case where a compound phase is not present, a lower coercive force and a low magnetic core loss can be provided.

Also, a magnetic core using the nanocrystalline soft magnetic alloy is involved in the present invention. The magnetic core according to the present invention is mainly used as a wound magnetic core and a laminated magnetic core, but can be also used as a pressed powder magnetic core, and a composite sheet and a composite magnetic core with a resin by pulverizing the magnetic material to powder. Since the magnetic core according to the present invention is composed of the nanocrystalline soft magnetic alloy exhibiting excellent soft magnetic properties, the magnetic core can be made of a low loss and of a small size.

Advantages of the Invention

Since the amorphous alloy ribbon according to the present invention is manufactured so that a Cu-segregated portion is present at a position deeper than 2 nm from the ribbon surface and the maximum value of the Cu concentration in the Cu-segregated portion is made to be 4 at. % or less, the amorphous alloy ribbon excellent in toughness can be obtained. Hence, punching, slitting and cutting work before the nanocrysallization becomes easy, and the ribbon can be worked in a state excellent in toughness before the anneal. Therefore, working a magnetic core composed of the nanocrystalline soft magnetic alloy can be avoided and the shape of a magnetic core can be freely established.

As the nanocrystalline soft magnetic alloy according to the present invention, that having little variation in characteristics and exhibiting excellent soft magnetic properties can be obtained by controlling the segregation of the Cu element and the segregation of oxygen.

BEST MODE FOR CARRYING OUT THE INVENTION

Hereinafter, the present invention will be described specifically by way of Examples, but the scope of the present invention is not limited to these Examples.

Example 1

An amorphous alloy ribbon of 50 mm wide and 19 μm thick having alloy composition of $Fe_{bal.}Cu_{0.98}Nb_{3.1}Si_{13.4}B_{9.3}$ in atomic percent was manufactured using a Cu based Cu—Be alloy roll in an atmosphere of an oxygen concentration of 20%. The ribbon was manufactured by regulating a cooling water amount and a water temperature so that the temperature of the alloy ribbon became 270° C. while the temperature of the alloy ribbon at a position of 250 mm from a tapping position (nozzle position) was being measured by a radiation thermometer. The manufactured amorphous alloy ribbon was subjected to the X-ray diffraction with respect to the free surface side and the roll surface side. As the result, it was confirmed that the diffraction showed a halo pattern peculiar to amorphous alloys and the alloy ribbon was an amorphous single phase. Also, the manufactured amorphous alloy ribbon was cut and investigated for workability. As the result, it was confirmed that no cracks occurred and the workability was excellent.

The manufactured alloy ribbon was measured for concentration distributions of the elements from the surface of the free surface (freely solidified surface) toward the inner part by a glow discharge optical emission spectroscopy (GDOES).

Figure 1:
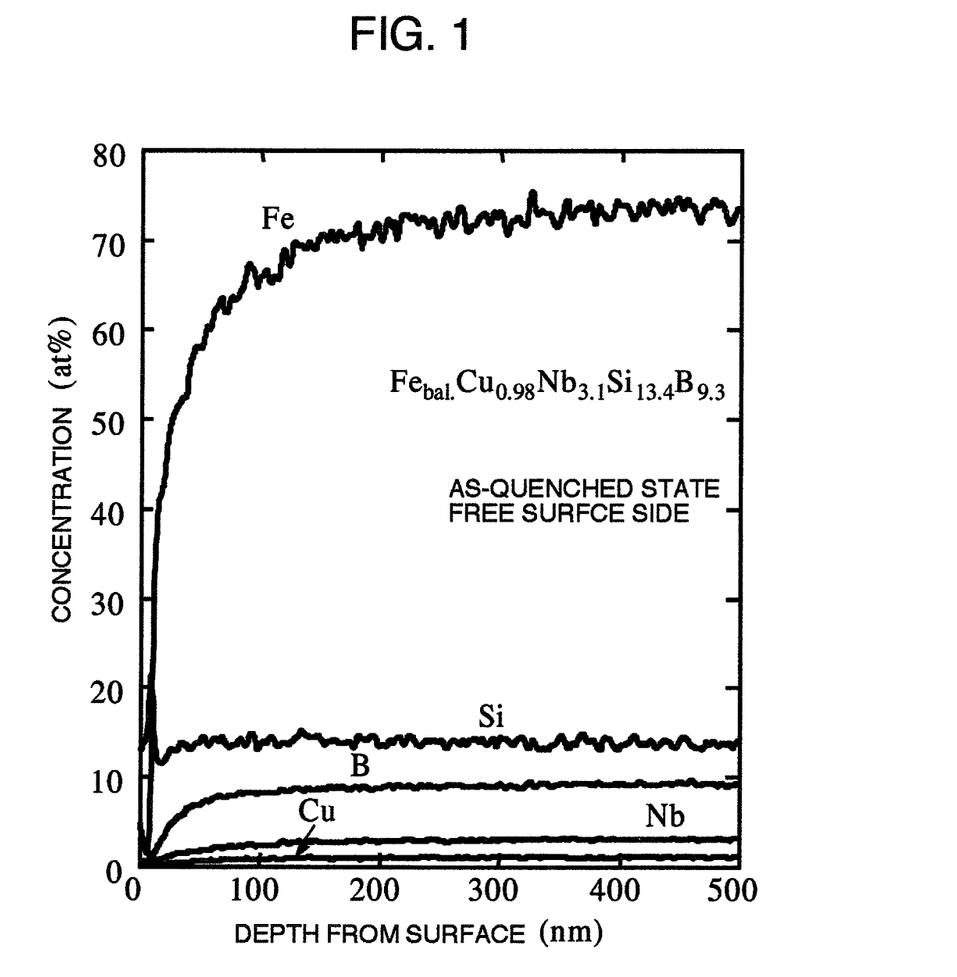
FIG. 1 is a diagram showing a measurement result of concentration distributions of elements, measured by GDOES from the free surface (freely solidified surface) toward the inner part of an amorphous alloy ribbon relevant to the present invention.
Figure 2:
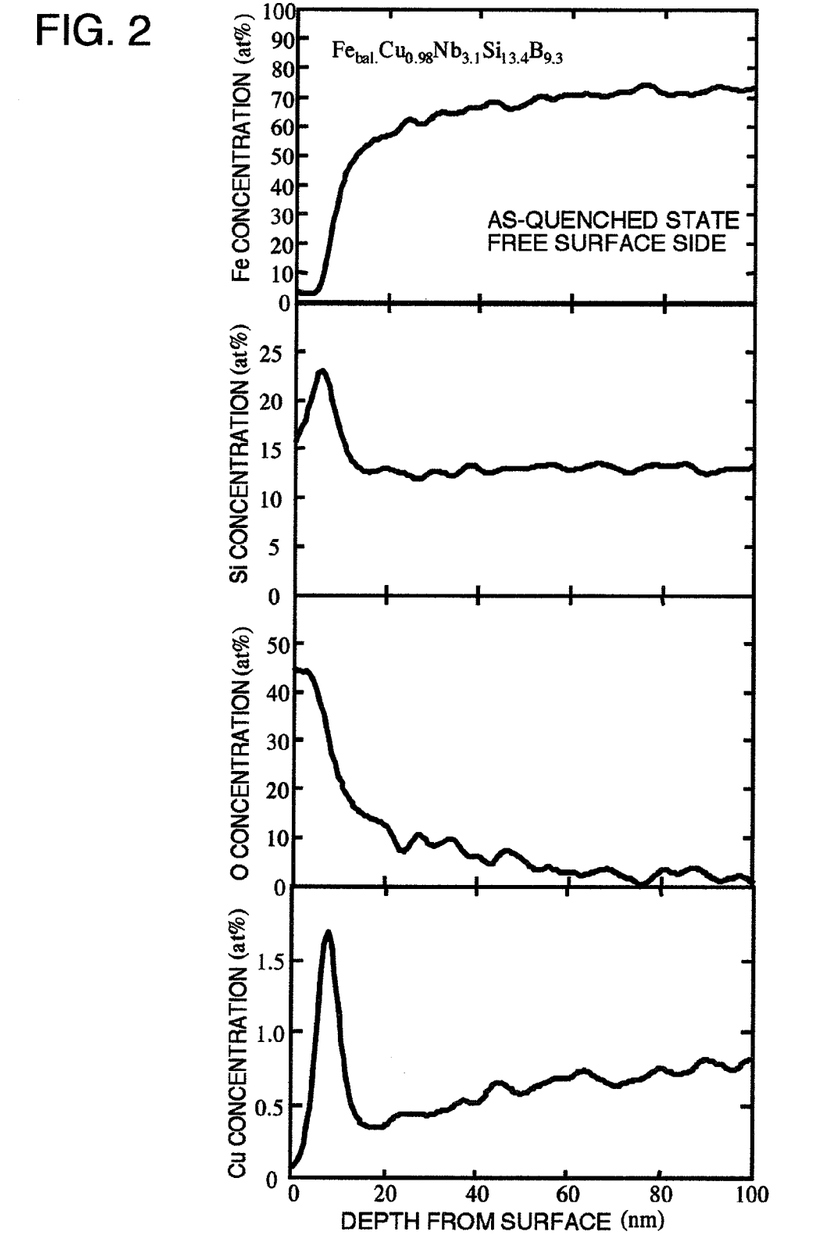
FIG. 2 is an enlarged diagram showing an example of measurement results of concentration distributions of Fe, Si, O and Cu in the range of 100 nm from the surface of the free surface (freely solidified surface), measured by GDOES from the surface toward the inner part of an amorphous alloy ribbon relevant to the present invention.

The results obtained by analysis of Fe, Si, B, Nb and Cu up to the depth of 500 nm are shown in FIG. 1. In FIG. 2, concentration distributions of Fe, Si, O and Cu of the same sample in the range of 100 nm from the surface are enlargedly shown. There were much of Si and O in the surface of the alloy where oxides such as $SiO_2$ were mainly formed. The Cu concentration in the Cu-segregated portion at a position of 7.4 nm from the surface where the Cu concentration reaches a maximum value was about 1.7 at. %, and a region of a low Cu concentration was present at a position, further deeper than the above position, of 18.2 nm from the surface. The Cu concentration in this region was lower than that at a position of 500 nm from the surface. The roll surface side also was subjected to the analysis by GDOES in the same way, and it was then confirmed that the surface had a similar concentration dependency.

Then, the alloy ribbon was wound into an outer diameter of 38 mm and an inner diameter of 30 mm to manufacture a wound magnetic core. A part of the wound magnetic core was subjected to cutting work, and then, a wound magnetic core having no cracks and a clear cutting surface was obtained. The wound magnetic core was held in a nitrogen gas atmosphere having a dew point of −61° C. at 550° C. for 1 hour for anneal. Magnetic properties of the wound magnetic core were: the magnetic flux density $B_{800}$ at 800 A/m was 1.24 T; the coercive force $H_c$ was 0.35 A/m; the maximum relative permeability $\mu_m$ was 1,100,000; and the relative initial permeability at 1 kHz was 129,000. As a result of the X-ray diffraction of the alloy after the anneal, it was confirmed that an Fe—Si crystal phase of a body-centered cubic (bcc) structure was formed. As a result of the structure observation by TEM, it was confirmed that no large crystals were present in the alloy surface and bcc Fe—Si crystal grains of about 12 nm in grain diameter were formed in the amorphous parent phase. Then, the alloy ribbon after the anneal was subjected to GDOES analysis in the same way. There were much of Si and O in the surface of the alloy where oxides such as $SiO_2$ were mainly formed. A Cu-segregated portion was present at a position of 15.6 nm from the surface. The Cu-segregated portion contained about 6 at. % and had a larger maximum value of the Cu concentration than that before the anneal. The amorphous alloy ribbon according to the present invention was excellent in toughness and was excellent also in magnetic properties of the nanocrystalline alloy after the nanocrystallization by the anneal.

For comparison, an alloy ribbon of the same composition was manufactured in an argon gas atmosphere using a Cu based Cu—Cr alloy roll. The alloy ribbon was manufactured by regulating so that the temperature of the alloy ribbon at a position of 250 mm from a tapping position (nozzle position) became 350° C. while the temperature of the alloy ribbon was being measured by a radiation thermometer. The manufactured amorphous alloy ribbon was subjected to the X-ray diffraction with respect to the free surface side and the roll surface side. As the result, it was confirmed that the diffraction showed a halo pattern peculiar to amorphous alloys and an amorphous phase was formed. The manufactured alloy ribbon was cut, and it was confirmed that cracks occurred and the workability was inferior. Concentration distributions of the elements were measured by GDOES from the surface of the free surface (freely solidified surface) toward the inner part of the manufactured alloy ribbon. The Cu concentration in the Cu-segregated portion became a maximum value at a position of 14.2 nm from the surface. The maximum value of the Cu concentration in this case was about 4.5 at. %, and the segregation of a high concentration of Cu is considered as a reason for deterioration of workability.

An amorphous alloy ribbon was manufactured in an atmosphere of an oxygen concentration of 20% using a Cu based Cu—Be alloy roll by regulating a cooling water amount and a water temperature so that the temperature of the alloy ribbon at a position of 250 mm from a tapping position (nozzle position) became 420° C. while the temperature of the alloy ribbon was being measured by a radiation thermometer. The manufactured alloy ribbon was cut, and it was then confirmed that cracks occurred similarly to the above and the workability was inferior. Concentration distributions of the elements were measured by GDOES from the surface of the free surface (freely solidified surface) toward the inner part of the manufactured alloy ribbon, and it was then confirmed that the maximum value of the concentration in the Cu-segregated portion was a value exceeding 4 at. %.

Example 2

The amorphous alloy ribbon obtained in Example 1 was wound into an outer diameter of 38 mm and an inner diameter of 30 mm to manufacture a wound magnetic core, and the wound magnetic core was held in a nitrogen gas atmosphere having a dew point of −61° C. at 550° C. for 1 hour for anneal to obtain a wound magnetic core composed of the nanocrystalline alloy according to the present invention. Magnetic properties of the wound magnetic core were: the magnetic flux density $B_{800}$ at 800 A/m was 1.24 T; the coercive force $H_c$ was 0.35 A/m; the maximum relative permeability $\mu_m$ was 1,100,000; and the relative initial permeability at 1 kHz was 129,000.

As a result of the X-ray diffraction of the alloy after the anneal, it was confirmed that an Fe—Si crystal phase of a body-centered cubic (bcc) structure was formed. As a result of the structure observation by TEM, it was confirmed that no large crystals were present in the alloy surface and bcc Fe—Si crystal grains of about 12 nm in grain diameter were formed in the amorphous parent phase.

Figure 3:
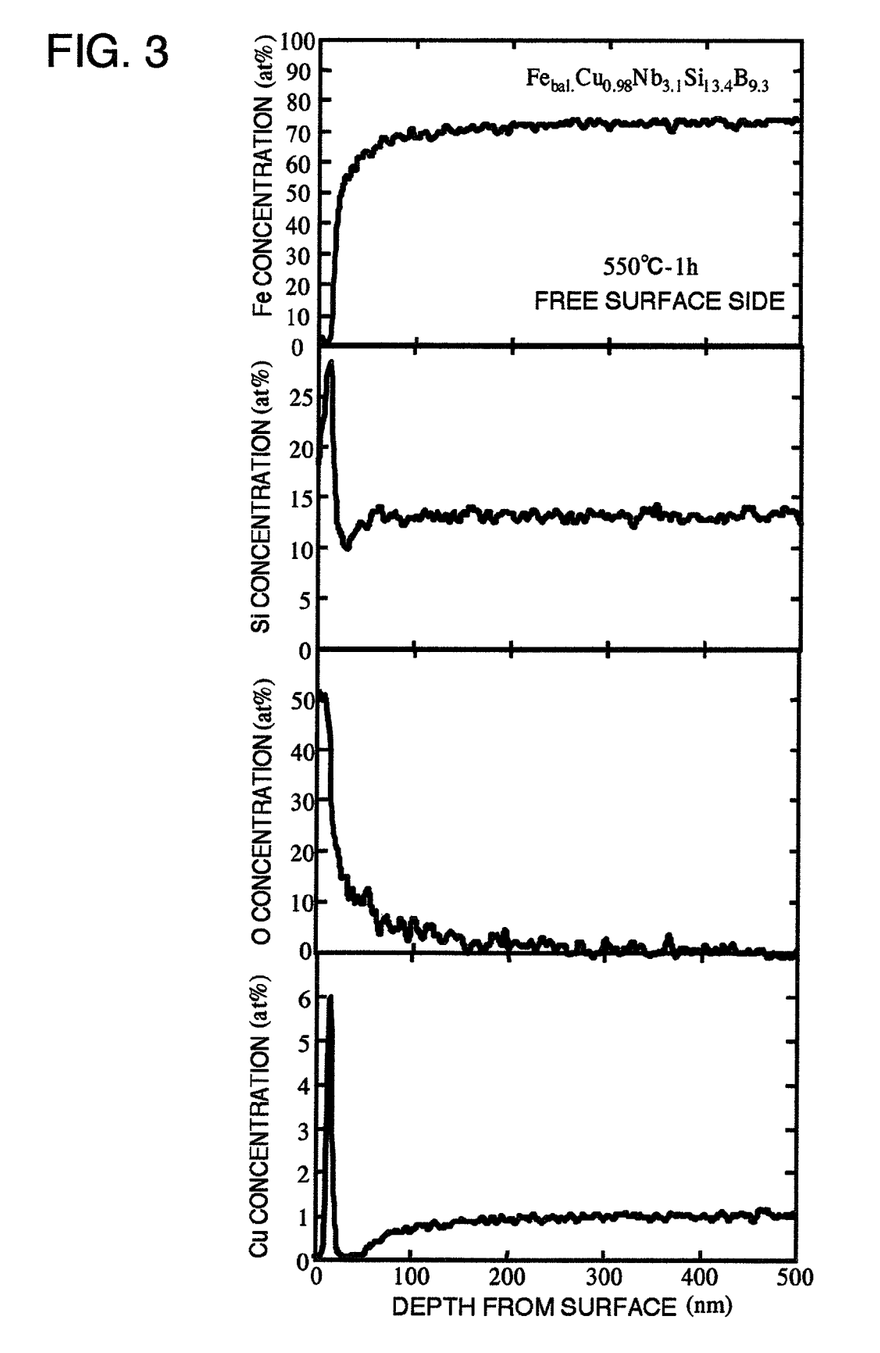
FIG. 3 is a diagram showing an example of concentration distributions of Fe, Si, O and Cu in the depth direction from the surface of the free surface side, measured by GDOES from the surface toward the inner part of a nanocrystalline soft magnetic alloy relevant to the present invention.
Figure 4:
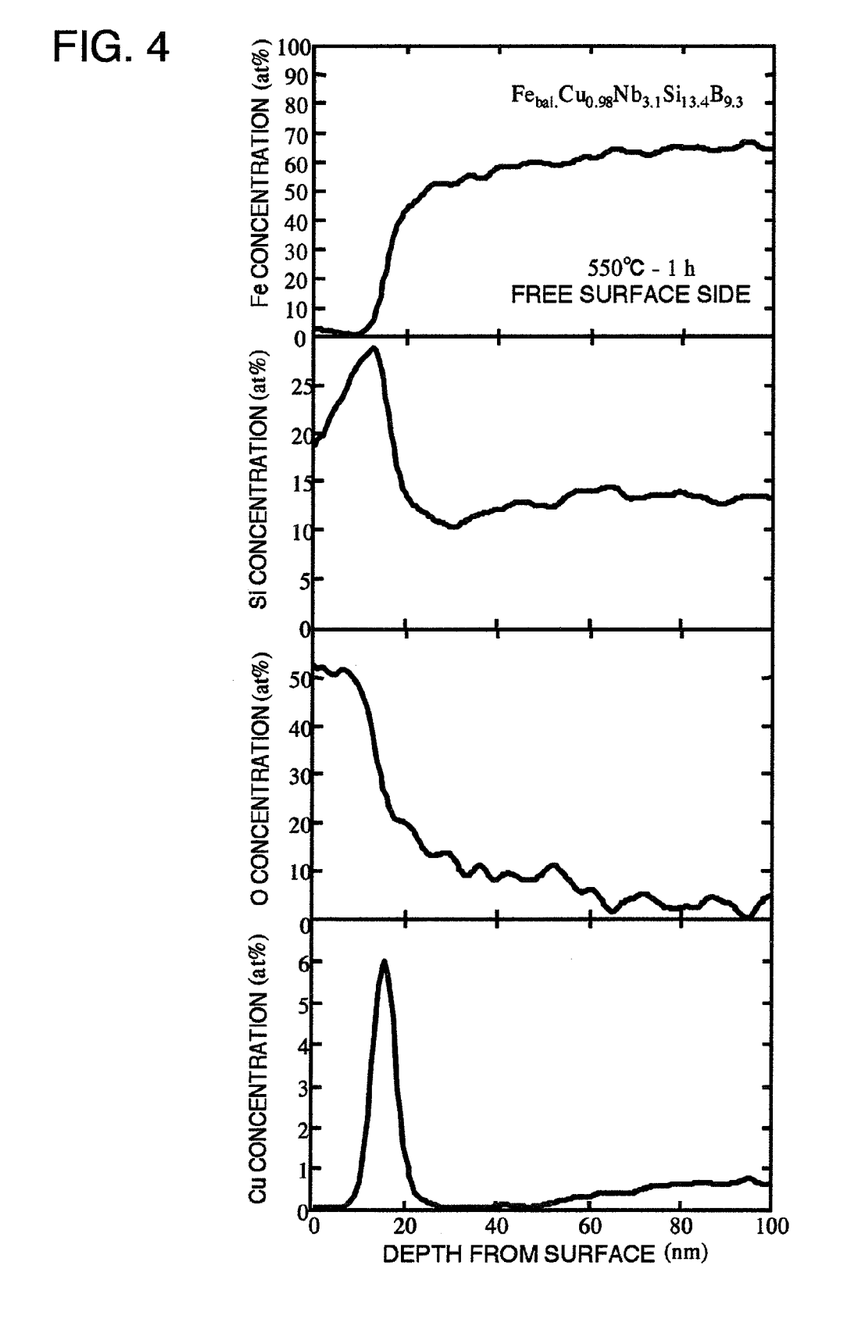
FIG. 4 is an enlarged diagram of FIG. 3 (the depth from the surface is in the range of 0 to 100 nm)

Then, the alloy ribbon after the anneal was subjected to GDOES analysis in the same way. Concentration distributions of Fe, Si, O and Cu in the depth direction from the surface of the free surface side, measured by GDOES from the surface toward the inner part, are shown in FIG. 3. In FIG. 4, concentration distributions of Fe, Si, O and Cu of the same sample in the range of 100 nm from the surface are enlargedly shown. There were much of Si and O in the surface of the alloy had oxides such as $SiO_2$ were mainly formed. A portion where the Cu concentration in the Cu-segregated portion reaches a maximum value was present at a position of 15.6 nm from the surface. The maximum value of the Cu concentration was about 6 at. %, and was larger than that before the anneal. A region of a low Cu concentration was present at a position further deeper than the position of 15.6 nm, and the Cu concentration in this region was a decreased one. This minimum Cu concentration was 0.07 at. %, and was less than 40 at. % of the Cu concentration (1.1 at. %) at a position of 500 nm from the surface. This region having the minimum Cu concentration was at a position of 36 nm from the surface. At a position of 12 nm from the surface, the oxygen concentration was 44.6 at. %; and the Fe concentration was 3.4 at. %; and the oxygen concentration was thus higher than the Fe concentration. When the Fe concentration at a position of 12 nm is low, the insulation property of a Si oxide layer formed on the surface becomes high. Therefore, high-frequency magnetic properties are improved and the variation can be reduced, which is preferable. The roll surface side was also subjected to the analysis by GDOES in the same way, and it was then confirmed that the surface had a similar concentration dependency.

Example 3

An amorphous alloy ribbon of 25 mm wide and 18 μm thick having alloy composition of $Fe_{bal.}Cu_{0.95}Nb_{3.0}Si_{15.5}B_{6.8}$ in atomic percent was manufactured using a Cu based Cu—Be alloy roll in an atmosphere of an oxygen concentration of 21%. The alloy ribbon was manufactured by regulating a cooling water amount and a water temperature so that the temperature of the alloy ribbon at a position of 250 mm from a tapping position (nozzle position) became 250° C. while the temperature of the alloy ribbon was being measured by a radiation thermometer. The manufactured amorphous alloy ribbon was subjected to the X-ray diffraction with respect to the free surface side and the roll surface side. As the result, it was confirmed that the diffraction showed a halo pattern peculiar to amorphous alloys and the alloy ribbon was an amorphous single phase. Concentration distributions of the elements was measured by GDOES from the surface of the roll surface (surface having contacted with the roll) toward the inner part of the manufactured alloy ribbon, and the measurement revealed that the Cu concentration in the Cu-segregated portion had a maximum value at a position of 8 nm from the surface as in Example 1. The maximum value of the Cu concentration was about 1.9 at. %, and it was confirmed that a region having low Cu concentration was present at a position of 19.3 nm, deeper than the position of 8 nm, from the surface. A ring-shaped sample was manufactured from the alloy ribbon by punching. Since the amorphous alloy ribbon according to the present invention was excellent in toughness, punching was possible without no cracks.

Example 4

The ring-shaped alloy sample of the amorphous alloy ribbon obtained in Example 2 was annealed in an argon gas atmosphere having a dew point of −70° C. at 550° C. for 1 hour to manufacture the nanocrystalline soft magnetic alloy magnetic core according to the present invention. The ring-shaped sample was stacked and put in a phenol resin-made core case, and measured for magnetic properties. $B_{800}$ was 1.23 T; $H_c$ was 0.4 A/m; the relative initial permeability $\mu_{1k}$ at 1 kHz was 168,000; the relative initial permeability $\mu_{100k}$ at 100 kHz was 16,500; and the magnetic core loss $P_{cm}$ at 0.2 T was 2.0 W/kg. The X-ray diffraction and the TEM observation of the alloy ribbon after the anneal were conducted. As the result, it was confirmed that 73% of the structure was composed of bcc Fe—Si crystal grains of about 14 nm in grain diameter. A diffraction peak of a ordered phase was also confirmed, and thus the presence of the ordered phase was confirmed. Then, a transformer was manufactured by winding wire on the manufactured magnetic core. The transformer was confirmed to have a low loss and good characteristics.

Figure 5:
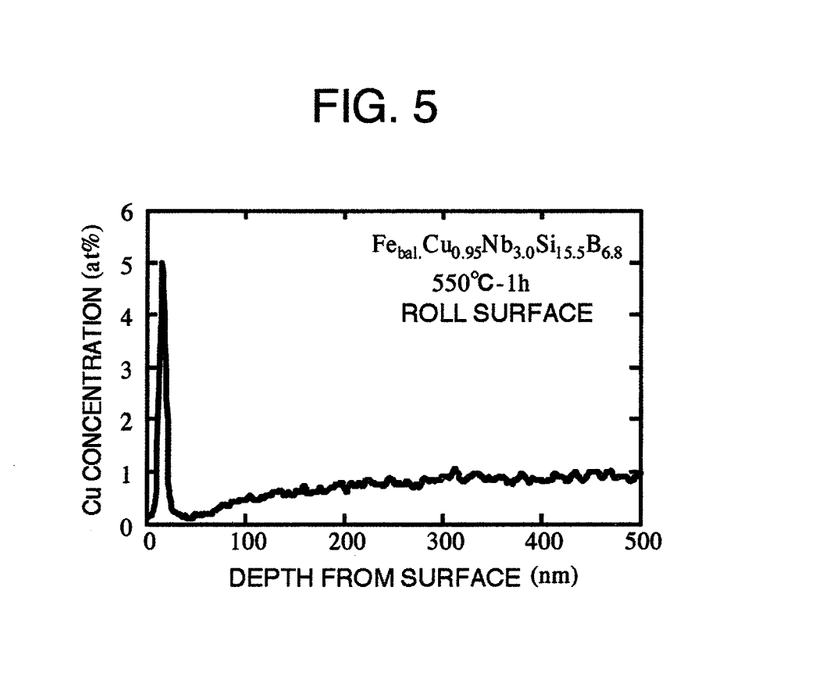
FIG. 5 is a diagram showing an example of concentration distributions of Fe, Si, O and Cu in the depth direction from the surface of the free surface side, measured by GDOES from the surface toward the inner part of a nanocrystalline soft magnetic alloy relevant to the present invention.
Figure 6:
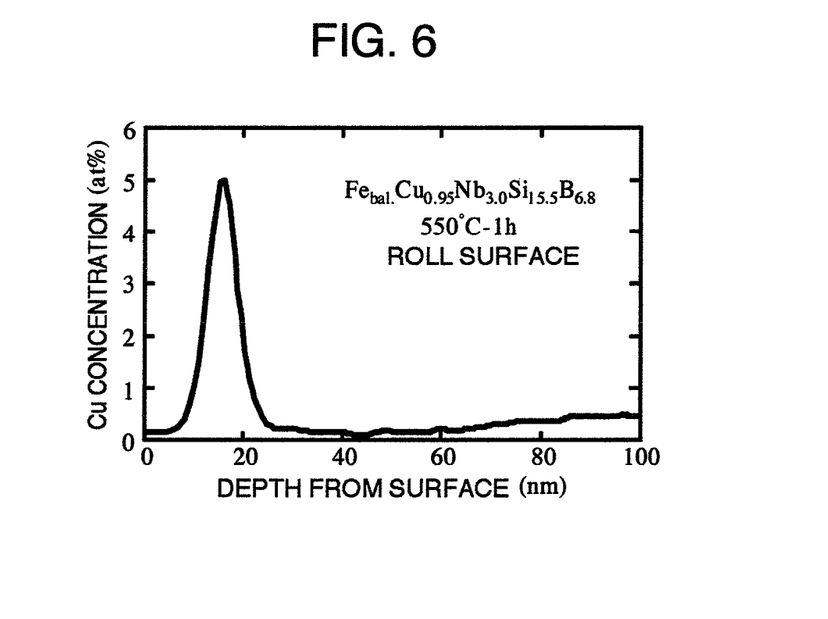
FIG. 6 is an enlarged diagram of FIG. 5 (the depth from the surface is in the range of 0 to 100 nm).

Then, a concentration distribution of Cu was measured by GDOES from the surface of the roll surface (surface having contacted with the roll) toward the inner part up to the depth of 500 nm. The concentration distribution is shown in FIG. 5. In FIG. 6, the concentration distribution of Cu of the same sample in the range of 100 nm from the surface is enlargedly shown. There were much of Si and O in the surface of the alloy where oxides such as $SiO_2$ were mainly formed. A Cu-segregated portion was present at a position of 15.8 nm from the surface. The maximum value of the Cu concentration in the Cu-segregated portion in this case was 5.0 at. %, and was larger than that before the anneal. A region having low Cu concentration was present at a position further deeper than the position of 15.8 nm, and the Cu concentration in this region was a decreased one. This minimum Cu concentration was 0.0152 at. %, and was less than 40% of the Cu concentration of 1.0 at. % at a position of 500 nm from the surface. This region having the minimum Cu concentration was at a position of 36.7 nm from the surface. At a position of 12 nm from the surface, the oxygen concentration was 42.1 at. %; and the Fe concentration was 5.6 at. %; and the oxygen concentration was thus higher than the Fe concentration.

Then, a transformer was manufactured by winding wire on the manufactured magnetic core. The transformer was confirmed to have a low loss and good characteristics.

Example 5

Amorphous alloy ribbons indicated in Table 1-1 and Table 1-2 were manufactured by the single roll method using a Cu based Cu—Be alloy roll in an atmosphere of an oxygen concentration of 20%.

In the Examples according to the present invention in Table 1-1, alloy ribbons were manufactured by regulating a cooling water amount and a water temperature so that the temperature of the alloy ribbons at a position of 250 mm from a tapping position (nozzle position) became 270° C. while the temperature of the alloy ribbons was being measured by a radiation thermometer. The manufactured amorphous alloy ribbons were subjected to the X-ray diffraction with respect to the free surface side and the roll surface side. As the result, it was confirmed that the diffractions showed a halo pattern peculiar to amorphous alloys and the alloy ribbons were an amorphous single phase. Also, the manufactured amorphous alloy ribbons were cut and investigated for workability. As the result, it was confirmed that no cracks occurred and the workability was excellent as shown in the Examples according to the present inventions in Table 1-1.

Then, the amorphous alloy ribbons in Table 1-1 were wound to make wound magnetic cores, and annealed in a nitrogen gas atmosphere having a dew point of −61° C. to manufacture magnetic cores of the nanocrystalline soft magnetic alloy according to the present invention. The magnetic cores were measured for the iron loss $P_{cm}$ at 20 kHz at 0.2 T. The X-ray diffraction for alloy ribbons after the anneal was conducted. As the result, it was confirmed that a Fe—Si crystal phase of a body-centered cubic (bcc) structure was formed. As a result of estimation of the average grain diameter from the Scherrer equation by the X-ray diffraction and the transmission electron microscopy (TEM), it was confirmed that bcc Fe—Si crystal grains of 50 nm in grain diameter were formed and the volume fraction thereof was 50% or more. Then, the alloy ribbons after the anneal were subjected to the GDOES analysis in the same way. The measurement results are shown in Table 2-1, the measurements being regarding a position from the surface where the Cu concentration in the Cu-segregated portion reaches a maximum, and a Cu concentration therein; a minimum value in a region where the Cu concentration is low, and a Cu concentration in a parent phase; a ratio, CC(O)/CC(Fe), of an oxygen concentration in atomic percent CC(O) and an Fe concentration in atomic percent CC(Fe) at a position of 12 nm from the surface; and an iron loss $P_{cm}$.

For comparison, measurement results in the case where the anneal was carried out in an atmosphere of a high vacuum degree of $1.3×10^{−3}$ Pa are shown in Table 2-2.

As a result, the nanocrystalline soft magnetic alloy according to the present invention was confirmed to exhibit excellent magnetic properties. By contrast, samples annealed in an atmosphere of a high vacuum degree were likely to have an iron loss of 3.0 W/kg or more. The case where the oxygen concentration in atomic percent was larger than the Fe concentration in atomic percent at a position of 12 nm from the surface was confirmed to be likely to have a lower iron loss in a high frequency than otherwise.

TABLE 1-1

|  | No. | Composition (at. %) | Position of the Maximum Value of Cu-Segregated Portion (nm) | The Maximum Value of Cu Concentration in Cu-Segregated Portion (at. %) | Cu Concentration at Position of 500 nm (at. %) | Crack Occurrence |
|---|---|---|---|---|---|---|
| Examples according to the Present Invention | 1 | $Fe_{bal.}Cu_{1.1}Nb_{7.0}B_{9.1}$ | 6.2 | 1.9 | 1.1 | absent |
| | 2 | $Fe_{bal.}Cu_{1.1}Nb_{3.0}Si_{13.5}B_{9.5}$ | 7.3 | 1.8 | 1.1 | absent |
| | 3 | $Fe_{bal.}Cu_{0.95}Nb_{3.0}Si_{15.5}B_{6.5}$ | 10.8 | 1.4 | 0.9 | absent |
| | 4 | $Fe_{bal.}Cu_{1.0}Mo_{3.0}Si_{13.8}B_{9.1}$ | 7.2 | 1.5 | 1.0 | absent |
| | 5 | $Fe_{bal.}Cu_{1.0}Ta_{3.0}Si_{13.8}B_{9.1}$ | 16.5 | 1.4 | 1.0 | absent |
| | 6 | $Fe_{bal.}Cu_{1.0}W_{4.0}Si_{13.8}B_{9.1}$ | 9.5 | 1.7 | 1.0 | absent |
| | 7 | $Fe_{bal.}Cu_{0.6}Nb_{3.0}V_{0.5}Si_{13.8}B_{9.1}$ | 8.8 | 1.9 | 1.0 | absent |
| | 8 | $Fe_{bal.}Cu_{1.0}Nb_{2.5}Ti_{0.5}Si_{13.5}B_{9.1}$ | 17.1 | 1.7 | 1.0 | absent |
| | 9 | $Fe_{bal.}Cu_{1.0}Nb_{2.5}Zr_{0.5}Si_{13.5}B_{9.1}$ | 7.6 | 1.8 | 1.0 | absent |
| | 10 | $Fe_{bal.}Cu_{1.0}Nb_{2.5}Hf_{0.5}Si_{13.5}B_{9.1}$ | 8.1 | 1.8 | 1.0 | absent |
| | 11 | $Fe_{bal.}Co_{5.0}Cu_{1.0}Nb_{3.0}Si_{13.8}B_{9.1}$ | 8.8 | 1.7 | 1.0 | absent |
| | 12 | $Fe_{bal.}Ni_{5.0}Cu_{1.2}Nb_{3.0}Si_{13.8}B_{9.1}$ | 9.8 | 2.1 | 1.2 | absent |
| | 13 | $Fe_{bal.}Cu_{1.0}Mo_{3.1}Si_{13.5}B_{8.8}C_{0.5}$ | 10.4 | 1.8 | 1.0 | absent |
| | 14 | $Fe_{bal.}Cu_{1.0}Nb_{3.0}Si_{13.5}B_{9.1}P_{0.5}$ | 11.3 | 1.6 | 1.0 | absent |
| | 15 | $Fe_{bal.}Cu_{1.0}Nb_{3.0}Si_{13.5}B_{9.1}Ga_{0.5}$ | 9.8 | 1.7 | 1.0 | absent |
| | 16 | $Fe_{bal.}Cu_{1.2}Nb_{3.0}Si_{14.5}B_{9.1}Cr_{0.8}$ | 12.2 | 2.0 | 1.2 | absent |
| | 17 | $Fe_{bal.}Cu_{1.0}Nb_{3.0}Si_{14.5}B_{9.1}Mn_{0.9}$ | 10.4 | 1.8 | 1.0 | absent |
| | 18 | $Fe_{bal.}Cu_{1.0}Nb_{3.0}Si_{14.5}B_{9.1}Zn_{0.01}$ | 8.2 | 1.8 | 1.0 | absent |
| | 19 | $Fe_{bal.}Cu_{1.0}Nb_{3.0}Si_{14.5}B_{9.1}As_{0.01}$ | 8.6 | 1.8 | 1.0 | absent |
| | 20 | $Fe_{bal.}Cu_{0.9}Nb_{3.0}Si_{14.5}B_{9.1}Se_{0.01}$ | 10.8 | 1.5 | 0.9 | absent |
| | 21 | $Fe_{bal.}Cu_{0.8}Nb_{3.0}Si_{14.5}B_{9.1}Sb_{0.01}$ | 11.7 | 1.4 | 0.8 | absent |
| | 22 | $Fe_{bal.}Cu_{1.0}Nb_{3.0}Si_{14.5}B_{9.1}Sn_{0.1}$ | 12.4 | 1.7 | 1.0 | absent |
| | 23 | $Fe_{bal.}Cu_{0.9}Nb_{3.0}Si_{14.5}B_{9.1}In_{0.01}$ | 9.7 | 1.6 | 0.9 | absent |
| | 24 | $Fe_{bal.}Cu_{1.0}Nb_{3.0}Si_{14.5}B_{9.1}Cd_{0.01}$ | 8.9 | 1.7 | 1.0 | absent |
| | 25 | $Fe_{bal.}Cu_{1.0}Nb_{3.0}Si_{14.5}B_{9.1}Ag_{0.01}$ | 8.8 | 1.8 | 1.0 | absent |
| | 26 | $Fe_{bal.}Cu_{0.9}Nb_{3.0}Si_{14.5}B_{9.1}Bi_{0.05}$ | 10.1 | 1.6 | 0.9 | absent |
| | 27 | $Fe_{bal.}Cu_{1.0}Nb_{3.0}Si_{14.5}B_{9.1}Mg_{0.01}$ | 10.4 | 1.7 | 1.0 | absent |
| | 28 | $Fe_{bal.}Cu_{1.1}Nb_{3.0}Si_{14.5}B_{9.1}Sc_{0.05}$ | 11.3 | 1.8 | 1.1 | absent |
| | 29 | $Fe_{bal.}Cu_{1.0}Nb_{1.5}Si_{12.5}B_{9.1}Re_{0.05}$ | 12.7 | 1.7 | 1.0 | absent |
| | 30 | $Fe_{bal.}Cu_{1.0}Nb_{3.0}Si_{14.5}B_{9.1}Au_{0.1}$ | 9.5 | 1.7 | 1.0 | absent |
| | 31 | $Fe_{bal.}Cu_{1.1}Nb_{3.0}Si_{14.5}B_{9.1}Pd_{0.1}$ | 13.4 | 1.8 | 1.1 | absent |
| | 32 | $Fe_{bal.}Cu_{1.0}Nb_{3.0}Si_{14.5}B_{9.1}Pt_{0.1}$ | 14.2 | 1.6 | 1.0 | absent |
| | 33 | $Fe_{bal.}Cu_{1.0}Nb_{3.0}Si_{14.5}B_{9.1}Y_{0.1}$ | 12.1 | 1.7 | 1.0 | absent |
| | 34 | $Fe_{bal.}Cu_{0.9}Nb_{3.0}Si_{14.5}B_{9.1}Sm_{0.1}$ | 10.8 | 1.6 | 0.9 | absent |

TABLE 1-2

|  | No. | Composition (at. %) | Position of the Maximum Value of Cu-Segregated Portion (nm) | The Maximum Value of Cu Concentration in Cu-Segregated Portion (at. %) | Cu Concentration at Position of 500 nm (at. %) | Crack Occurrence |
|---|---|---|---|---|---|---|
| Comparative Examples | 35 | $Fe_{bal.}Cu_{1.1}Nb_{3.0}Si_{13.5}B_{9.5}$ | 7.9 | 4.1 | 1.1 | present |
| | 36 | $Fe_{bal.}Cu_{1.4}Nb_{5.0}Si_{15.5}B_{7.2}$ | 14.2 | 4.4 | 1.4 | present |
| | 37 | $Fe_{bal.}Cu_{1.3}Nb_{4.0}Si_{15.8}B_{6.5}$ | 13.2 | 4.3 | 1.3 | present |
| | 38 | $Fe_{bal.}Cu_{1.2}Nb_{4.2}Si_{14.8}B_{6.5}P_{1.5}$ | 11.8 | 4.1 | 1.2 | present |
| | 39 | $Fe_{bal.}Cu_{1.9}Nb_{2.8}Si_{10.8}B_{9.5}$ | 14.3 | 4.9 | 1.9 | present |
| | 40 | $Fe_{bal.}Cu_{1.7}Nb_{3.5}Si_{11.8}B_{9.2}$ | 13.6 | 4.7 | 1.7 | present |
| | 41 | $Fe_{bal.}Cu_{1.7}Nb_{3.1}Si_{11.8}B_{9.2}Ta_{1.0}$ | 12.6 | 4.6 | 1.7 | present |
| | 42 | $Fe_{bal.}Cu_{1.5}Nb_{3.5}Si_{14.8}B_{9.1}Ga_{2.0}$ | 15.5 | 4.7 | 1.5 | present |

TABLE 2-1

|  | No. | Composition (at. %) | Peak Position of Cu Concentration (nm) | Cu Peak Concentration (at. %) | The Minimum Value of Cu Concentration (at. %) | Cu Concentration at Position of 500 nm (at. %) | CC(0)/ CC(Fe) | $P_{cm}$ (W/Kg) |
|---|---|---|---|---|---|---|---|---|
| Examples according to the Present Invention | 43 | $Fe_{bal.}Cu_{1.1}Nb_{7.0}B_{9.1}$ | 13.4 | 5.9 | 0.10 | 1.1 | 13.0 | 2.1 |
|  | 44 | $Fe_{bal.}Cu_{1.1}Nb_{3.0}Si_{13.5}B_{9.5}$ | 12.2 | 5.8 | 0.08 | 1.1 | 12.8 | 2.1 |
|  | 45 | $Fe_{bal.}Cu_{0.95}Nb_{3.0}Si_{15.5}B_{6.5}$ | 11.8 | 4.8 | 0.02 | 0.9 | 7.3 | 2.2 |
|  | 46 | $Fe_{bal.}Cu_{1.0}Mo_{3.0}Si_{13.8}B_{9.1}$ | 11.5 | 6.1 | 0.09 | 1.0 | 13.3 | 2.4 |
|  | 47 | $Fe_{bal.}Cu_{1.0}Ta_{3.0}Si_{13.8}B_{9.1}$ | 16.6 | 6.2 | 0.08 | 1.0 | 7.4 | 2.3 |
|  | 48 | $Fe_{bal.}Cu_{1.0}W_{4.0}Si_{13.8}B_{9.1}$ | 12.6 | 5.9 | 0.10 | 1.0 | 13.4 | 2.6 |
|  | 49 | $Fe_{bal.}Cu_{0.6}Nb_{3.0}V_{0.5}Si_{13.8}B_{9.1}$ | 12.3 | 4.3 | 0.03 | 1.0 | 8.2 | 2.2 |
|  | 50 | $Fe_{bal.}Cu_{1.0}Nb_{2.5}Ti_{0.5}Si_{13.5}B_{9.1}$ | 17.3 | 5.9 | 0.04 | 1.0 | 6.5 | 2.8 |
|  | 51 | $Fe_{bal.}Cu_{1.0}Nb_{2.5}Zr_{0.5}Si_{13.5}B_{9.1}$ | 12.1 | 5.8 | 0.09 | 1.0 | 6.8 | 2.9 |
|  | 52 | $Fe_{bal.}Cu_{1.0}Nb_{2.5}Hf_{0.5}Si_{13.5}B_{9.1}$ | 10.5 | 6.1 | 0.10 | 1.0 | 6.7 | 2.7 |
|  | 53 | $Fe_{bal.}Co_{5.0}Cu_{1.0}Nb_{3.0}Si_{13.8}B_{9.1}$ | 10.7 | 5.5 | 0.11 | 1.0 | 7.3 | 2.9 |
|  | 54 | $Fe_{bal.}Ni_{5.0}Cu_{1.2}Nb_{3.0}Si_{13.8}B_{9.1}$ | 12.4 | 5.4 | 0.11 | 1.2 | 7.4 | 2.8 |
|  | 55 | $Fe_{bal.}Cu_{1.0}Mo_{3.1}Si_{13.5}B_{8.8}C_{0.5}$ | 11.1 | 5.8 | 0.07 | 1.0 | 13.2 | 2.6 |
|  | 56 | $Fe_{bal.}Cu_{1.0}Nb_{3.0}Si_{13.5}B_{9.1}P_{0.5}$ | 11.6 | 5.7 | 0.08 | 1.0 | 7.9 | 2.2 |
|  | 57 | $Fe_{bal.}Cu_{1.0}Nb_{3.0}Si_{13.5}B_{9.1}Ga_{0.5}$ | 10.4 | 5.9 | 0.05 | 1.0 | 8.8 | 2.1 |
|  | 58 | $Fe_{bal.}Cu_{1.2}Nb_{3.0}Si_{14.5}B_{9.1}Cr_{0.8}$ | 12.8 | 6.2 | 0.08 | 1.2 | 6.2 | 2.3 |
|  | 59 | $Fe_{bal.}Cu_{1.0}Nb_{3.0}Si_{14.5}B_{9.1}Mn_{0.9}$ | 13.0 | 6.0 | 0.06 | 1.0 | 9.9 | 2.3 |
|  | 60 | $Fe_{bal.}Cu_{1.0}Nb_{3.0}Si_{14.5}B_{9.1}Zn_{0.01}$ | 12.5 | 5.9 | 0.01 | 1.0 | 8.2 | 2.2 |
|  | 61 | $Fe_{bal.}Cu_{1.0}Nb_{3.0}Si_{14.5}B_{9.1}As_{0.01}$ | 12.2 | 5.9 | 0.02 | 1.0 | 8.8 | 2.4 |
|  | 62 | $Fe_{bal.}Cu_{0.9}Nb_{3.0}Si_{14.5}B_{9.1}Se_{0.01}$ | 12.3 | 5.7 | 0.03 | 0.9 | 9.2 | 2.4 |
|  | 63 | $Fe_{bal.}Cu_{0.8}Nb_{3.0}Si_{14.5}B_{9.1}Sb_{0.01}$ | 12.1 | 5.6 | 0.02 | 0.8 | 9.1 | 2.3 |
|  | 64 | $Fe_{bal.}Cu_{1.0}Nb_{3.0}Si_{14.5}B_{9.1}Sn_{0.1}$ | 12.4 | 5.7 | 0.08 | 1.0 | 7.9 | 2.1 |
|  | 65 | $Fe_{bal.}Cu_{0.9}Nb_{3.0}Si_{14.5}B_{9.1}In_{0.01}$ | 12.2 | 5.7 | 0.07 | 0.9 | 7.8 | 2.4 |
|  | 66 | $Fe_{bal.}Cu_{1.0}Nb_{3.0}Si_{14.5}B_{9.1}Cd_{0.01}$ | 12.0 | 5.8 | 0.09 | 1.0 | 8.2 | 2.6 |
|  | 67 | $Fe_{bal.}Cu_{1.0}Nb_{3.0}Si_{14.5}B_{9.1}Ag_{0.01}$ | 12.3 | 5.9 | 0.10 | 1.0 | 8.9 | 2.2 |
|  | 68 | $Fe_{bal.}Cu_{0.9}Nb_{3.0}Si_{14.5}B_{9.1}Bi_{0.05}$ | 12.2 | 5.7 | 0.08 | 0.9 | 8.3 | 2.3 |
|  | 69 | $Fe_{bal.}Cu_{1.0}Nb_{3.0}Si_{14.5}B_{9.1}Mg_{0.01}$ | 12.4 | 5.9 | 0.07 | 1.0 | 7.9 | 2.2 |
|  | 70 | $Fe_{bal.}Cu_{1.1}Nb_{3.0}Si_{14.5}B_{9.1}Sc_{0.05}$ | 12.1 | 6.3 | 0.07 | 1.1 | 7.9 | 2.1 |
|  | 71 | $Fe_{bal.}Cu_{1.0}Nb_{1.5}Si_{12.5}B_{9.1}Re_{0.05}$ | 13.0 | 6.0 | 0.09 | 1.0 | 11.8 | 2.0 |
|  | 72 | $Fe_{bal.}Cu_{1.0}Nb_{3.0}Si_{14.5}B_{9.1}Au_{0.1}$ | 12.0 | 5.9 | 0.10 | 1.0 | 8.9 | 2.0 |
|  | 73 | $Fe_{bal.}Cu_{1.1}Nb_{3.0}Si_{14.5}B_{9.1}Pd_{0.1}$ | 13.6 | 6.2 | 0.11 | 1.1 | 7.9 | 2.1 |
|  | 74 | $Fe_{bal.}Cu_{1.0}Nb_{3.0}Si_{14.5}B_{9.1}Pt_{0.1}$ | 14.3 | 5.8 | 0.08 | 1.0 | 7.8 | 2.2 |
|  | 75 | $Fe_{bal.}Cu_{1.0}Nb_{3.0}Si_{14.5}B_{9.1}Y_{0.1}$ | 12.5 | 5.9 | 0.06 | 1.0 | 12.7 | 2.4 |
|  | 76 | $Fe_{bal.}Cu_{0.9}Nb_{3.0}Si_{14.5}B_{9.1}Sm_{0.1}$ | 11.2 | 5.7 | 0.07 | 0.9 | 12.7 | 2.8 |

TABLE 2-2

|  | No. | Composition (at. %) | Peak Position of Cu Concentration (nm) | Cu Peak Concentration (at. %) | The Minimum Value of Cu Concentration (at. %) | Cu Concentration at Position of 500 nm (at. %) | CC(0)/ CC(Fe) | $P_{cm}$ (W/Kg) |
|---|---|---|---|---|---|---|---|---|
| Comparative Examples | 77 | $Fe_{bal.}Cu_{1.1}Nb_{3.0}Si_{13.5}B_{9.5}$ | 14.2 | 6.4 | 0.08 | 1.5 | 0.92 | 3.4 |
|  | 78 | $Fe_{bal.}Cu_{1.0}Nb_{3.0}Si_{15.1}B_{6.8}$ | 14.3 | 6.4 | 0.08 | 1.4 | 0.88 | 3.2 |
|  | 79 | $Fe_{bal.}Cu_{1.1}Nb_{3.5}Si_{15.5}B_{6.7}$ | 13.5 | 6.3 | 0.07 | 1.3 | 0.79 | 3.3 |
|  | 80 | $Fe_{bal.}Cu_{1.2}Nb_{3.8}Si_{14.8}B_{6.6}P_{1.1}$ | 12.2 | 6.2 | 0.06 | 1.2 | 0.91 | 3.2 |
|  | 81 | $Fe_{bal.}Cu_{1.9}Nb_{2.8}Si_{11.8}B_{9.2}$ | 14.4 | 6.7 | 0.05 | 1.9 | 0.88 | 3.8 |
|  | 82 | $Fe_{bal.}Cu_{1.7}Nb_{3.5}Si_{12.8}B_{8.8}$ | 13.8 | 6.6 | 0.06 | 1.7 | 0.94 | 3.5 |
|  | 83 | $Fe_{bal.}Cu_{1.7}Nb_{3.1}Si_{11.8}B_{9.2}Ta_{0.5}$ | 15.7 | 6.5 | 0.06 | 1.7 | 0.95 | 3.6 |
|  | 84 | $Fe_{bal.}Cu_{1.4}Nb_{3.5}Si_{14.8}B_{9.1}Ga_{1.0}$ | 14.8 | 6.4 | 0.07 | 1.5 | 0.86 | 3.5 |

Example 6

Ring-shaped samples were punched from amorphous alloy ribbons of alloy compositions indicated in Table 1-1 using a mold, and the toughness was investigated by whether or not the samples were clearly punched. The Cu concentration in the Cu-segregated portion from the surface and the Cu concentration in the parent phase are shown together in Table 1-1. The amorphous alloy ribbons in which the Cu concentration in the Cu-segregated portion was 4 at. % or less were excellent in toughness, and were possible to subject to work such as punching. By contrast, as shown in Table 1-2, the amorphous alloy ribbons in which the Cu concentration in the Cu-segregated portion exceeded 4 at. % occurred cracks when they were punched.

INDUSTRIAL APPLICABILITY

The present invention can be utilized as an amorphous alloy ribbon having excellent workability for a nanocrystalline soft magnetic alloy, a nanocrystalline soft magnetic alloy exhibiting excellent magnetic properties, and a magnetic core using the nanocrystalline soft magnetic alloy, used for various types of transformers, various types of reactors and choke coils, noise suppression parts, pulse power magnetic components used for laser power sources, accelerators and the like, pulse transformers for communication, various types of motor magnetic cores, various types of power generators, various types of magnetic sensors, antenna magnetic cores, various types of current sensors, magnetic shields, and the like.

The invention claimed is:

1. A nanocrystalline soft magnetic alloy comprising an annealed alloy ribbon made of an amorphous alloy having a composition represented by $Fe_{100-a-b-c-d}M_aSi_bB_cCu_d$ (wherein 0 at. %≦a≦10 at. %, 0 at. %≦b≦20 at. %, 4 at. %≦c≦20 at. %, 0.1 at. %≦d≦3 at. %, and 9 at. %≦a+b+c≦35 at. %) and inevitable impurities, wherein M in the alloy composition comprises at least one element selected from Ti, V, Zr, Nb, Mo, Hf, Ta and W;

the nanocrystalline soft magnetic alloy further comprising:
a crystalline grain which has an average grain diameter of 50 nm or less, exists in a volume ratio of 50% or more, and has a Cu-segregated portion in which Cu is segregated at a position deeper than 2 nm from the surface of the annealed alloy ribbon, wherein a Cu concentration in the Cu-segregated portion is higher than Cu concentrations on the outermost surface of the annealed alloy ribbon and at a depth position of 500 nm from the surface of the annealed alloy ribbon, and a maximum value of the Cu concentration in the Cu-segregated portion is 6 at. % or less by measurement of Glow Discharge Optical Emission Spectroscopy (GDOES); and a region in which the Cu concentration is lower than the Cu concentration in a parent phase at a position deeper than the Cu-segregated portion, and a minimum value of the Cu concentration in the region is less than 40% of the Cu concentration in the parent phase; and wherein an oxygen concentration at a position of 12 nm from the surface of the annealed alloy ribbon is higher than a Fe concentration thereat therein.

2. The nanocrystalline soft magnetic alloy according to claim 1, wherein the maximum value of the Cu concentration in the Cu-segregated portion is two or more times the Cu concentration in the parent phase.

3. A magnetic core, comprising the nanocrystalline soft magnetic alloy according to claim 1.

* * * * *

UNITED STATES PATENT AND TRADEMARK OFFICE
CERTIFICATE OF CORRECTION

| | |
|---|---|
| PATENT NO. | : 8,414,712 B2 |
| APPLICATION NO. | : 12/675286 |
| DATED | : April 9, 2013 |
| INVENTOR(S) | : Yoshizawa et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 232 days.

Signed and Sealed this
Nineteenth Day of November, 2013

Teresa Stanek Rea
*Deputy Director of the United States Patent and Trademark Office*